United States Patent [19]

Axelson

[11] 4,259,031

[45] Mar. 31, 1981

[54] METHOD AND APPARATUS FOR FEEDING A PROCESSING MACHINE

[75] Inventor: Sven-Inge Axelson, Bredaryd, Sweden

[73] Assignee: Maskin AB Rapid, Sweden

[21] Appl. No.: 50,203

[22] Filed: Jun. 20, 1979

[30] Foreign Application Priority Data

Jun. 22, 1978 [SE] Sweden .................................. 7807142

[51] Int. Cl.³ .......................................... B65G 53/66
[52] U.S. Cl. ...................................... 406/21; 406/24; 406/85; 406/139; 406/175
[58] Field of Search ....................... 406/22, 23, 24, 21, 406/85, 93, 94, 108, 122, 139, 144, 168, 171, 175, 50, 154, 19; 222/52, 56, 64

[56] References Cited

U.S. PATENT DOCUMENTS

| | | | |
|---|---|---|---|
| 3,239,278 | 3/1966 | Mueller et al. | 406/94 |
| 3,258,296 | 6/1966 | von Funk | 406/23 X |
| 3,310,349 | 3/1967 | Tilley et al. | 406/171 |
| 3,506,111 | 4/1970 | Eppenberger | 406/24 |
| 3,708,208 | 1/1973 | Fuss | 406/144 |
| 3,829,165 | 8/1974 | Boon | 406/175 X |

FOREIGN PATENT DOCUMENTS

7810012  4/1979  Netherlands ............................. 406/85

*Primary Examiner*—James L. Rowland
*Attorney, Agent, or Firm*—Eugene E. Geoffrey, Jr.

[57] ABSTRACT

A method and apparatus for feeding material intermittently discharged from one machine, primarily an injection molding machine, to another machine, primarily a granulator mill. The feeding-in operation offers low energy consumption, great flexibility as regards material particle size and discharge rate for the grinding material, as well as minimal hazard risk. A predetermined amount of material is collected in a receiving compartment whereafter the collected material amount is moved along a supply path into the granulator mill by means of one or more currents of driving gas which flow through the receiving compartment and are led off from the supply path before reaching the granulator mill itself. The driving gas which is discharged intermittently only during the actual feeding cycle also opens a pivotal flap disposed in the supply path and preventing goods being subjected to grinding from being flung out of the granulator mill.

7 Claims, 1 Drawing Figure

U.S. Patent  Mar. 31, 1981  4,259,031
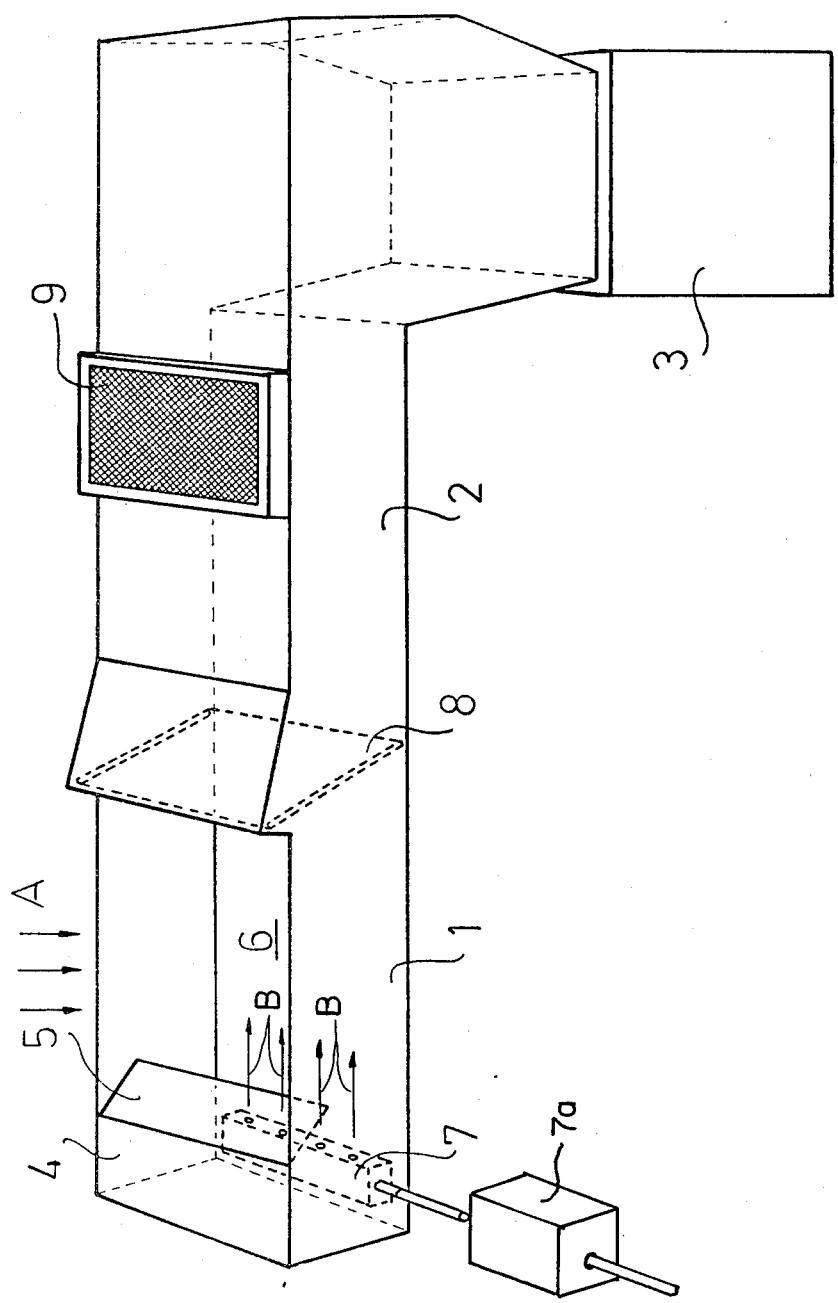

METHOD AND APPARATUS FOR FEEDING A PROCESSING MACHINE

The present invention relates to a method and an apparatus for feeding material, discharged from an intermittently operating machine, primarily an injection molding machine for plastic, into another processing machine, primarily a granulator.

The plastic industry makes extensive use of fully automatic injection molding machines which intermittently give off, from the molding tool, various scrap pieces, such as sprues or the like. In certain situations, such scrap pieces may constitute a large portion of the total amount of plastic material supplied to the injection molding machine and it is, therefore, an urgent need within the art to be able, in a simple and rational manner, to take care and advantage of these scrap pieces for re-use. In order to allow for this re-use, the scrap pieces must be collected before they have time to become polluted, whereafter the scrap pieces are ground down to granular form of suitable particle size, whereafter the granulate is re-used in the same injection molding machine or is stored for use on a later occasion.

In this context, it is known in the art, for collecting and transferring the scrap pieces to a granulator mill, to use both screw conveyors and belt conveyors. However, for various reasons, these prior art conveyor types are not ideal for this purpose. Thus, for example, a screw conveyor is expensive to manufacture and requires a relatively high level of energy supply since it must be kept running continuously despite the fact that the discharge of grinding material, that is to say scrap pieces from the injection molding machine, merely takes place intermittently. Furthermore, a certain comminution of the grinding material often takes place in the screw conveyor, with the result that the screw conveyor will become contaminated with more or less large particles of grinding material, which, in many situations, necessitates a careful cleaning of the screw conveyor before it may be used for the conveyance of a different material quality, or of grinding material of another color.

Belt conveyors also possess the disadvantage of a relatively high energy consumption, since these must also be kept running continuously. Moreover, belt conveyors may only be used in certain situations when the difference in height between the collection point and the discharge point for the grinding material lies within certain limits. Moreover, belt conveyors may, in certain situations, be subjected to operational disturbances in the form of pieces of grinding material which have become stuck between the conveyor belt proper and the rollers on which the belt runs.

The object of the present invention is, therefore, to realize a method of feeding a processing machine with material whereby the above-mentioned disadvantages in prior art methods will be obviated.

According to the invention, this object is achieved by the method, mentioned by way of introduction, which is characterized in that a predetermined amount of material is collected in a receiving compartment, that the collected amount of material is moved along a supply path into the processing machine by means of one or more currents of driving gas, and that the major fraction of the driving gas is led off from the supply path before reaching the processing machine. For minimizing energy consumption, the method according to the invention is further characterized in that the supply of driving gas is effected intermittently, this supply of driving gas being commenced when the predetermined amount of material has been collected, and being discontinued when this material has reached the processing machine, the driving gas supply being discontinued during the collection time for a new predetermined amount of material.

It is, furthermore, advisable according to the invention that the driving gas supply be regulated in dependence upon the rate of material discharge of the material-discharging machine.

A further object of the present invention is to realize an apparatus for carrying out the above-outlined method, this apparatus being designed in such a manner that it is not possessed of the disadvantages inherent in prior art apparatuses of similar type.

This object is achieved according to the invention by means of an apparatus, for carrying out the above-disclosed method, which comprises a receiving portion for the material and a supply portion communicating this receiving portion with the processing machine, the apparatus being characterized by nozzle means for discharging one or more gas currents, the nozzle means being located at the end of the receiving portion distal with respect to the supply portion and being disposed to direct the current or currents through the receiving portion into the supply portion, and that the supply portion is provided with a gas-permeable member.

It is a further object of the present invention to render its subject matter as energy-saving as possible, this being achieved suitably in that the nozzle means is provided with a flow communication to a regulating device for the intermittent supply of gas to the nozzle means.

The invention will be described in greater detail below with reference to the accompanying drawing which schematically illustrates an apparatus for carrying out the feeding method according to the invention.

As will be apparent from the accompanying drawing, the apparatus for carrying out the method according to the invention comprises a receiving portion 1 which is open at the top for receiving material in the direction intimated by means of the arrows A. The receiving portion 1 is preferably manufactured integrally with a supply portion 2 which may be of generally optional length and is connected to a granulator mill 3 (shown but schematically on the drawing).

The granulator mill schematically shown at 3 is of such a type as comprises a rotor which is provided with a number of blades which pass closely adjacent, fixedly mounted corresponding blades, the grinding material located between the blades being comminuted and kept in motion by the rotating blades such that the grinding material passes repeatedly through the gaps between the blades until such time as the particle size of the grinding material has been reduced to such a level that the grinding material may pass through a perforated plate in the bottom of the mill itself and down into a receptacle. The above-outlined design of the mill also entails that the grinding material which is being subjected to grinding shows a certain tendency to be flung out rearwardly from the mill, which, naturally, must be prevented in one way or another.

As will further be apparent from the drawing, both the receiving portion and the supply portion may be manufactured in the form of sheet-metal tubing which is suitably of rectangular cross-section. In the receiving portion, this sheet-metal tubing possesses no upper face so that a trough or the like is formed which is open at the top, in which trough the grinding material is collected. At that end of the receiving portion which is distal from the supply portion 2, the receiving portion is suitably provided, along a short distance, with an upper face 4 which merges in a slide plate 5 which is inclined downwardly towards the bottom surface of the receiving portion. The slide plate 5 extends downwardly towards the bottom 6 of the receiving portion a distance such that a gap is formed between the under edge of the slide plate 5 and the bottom 6, the width of the gap suitably amounting to from 2 to 6 cm.

A nozzle means 7 is disposed in the space beneath the upper face 4 of the receiving portion and the slide plate 5, the nozzle means being provided with one or more nozzles for discharging gas jets, preferably compressed air jets, parallel to and slightly spaced above the bottom 6 of the receiving portion. These gas jets are intimated on the FIGURE by means of the arrows B and are directed such as to pass through the gap formed between the under edge of the slide plate 5 and the bottom 6 of the receiving portion.

At the end of the receiving portion 1 distal from the nozzle means 7, a pivotal flap 8 is disposed and is pivotal on a shaft which is parallel to the upper face of the receiving portion and the supply portion. Furthermore, the flap 8 is suitably directed somewhat obliquely with respect to the bottom 6 of the receiving portion such that its under edge is located a greater distance from the nozzle means 7 than is its upper edge where its pivot shaft is located. The flap 8 is freely pivotal and is of such a weight that, when compressed air flows as shown by the arrows B, the flap is pivoted out of the way so that the compressed air jets B may pass into the supply portion 2. As soon as the flow along the arrows B ceases, the flap 8 is pivoted to its initial position either under the force of gravity or possibly under the action of a weak spring.

As was mentioned above, the supply portion 2 may suitably be designed as sheet-metal tubing of rectangular cross-section. In the upper side of the supply portion there is disposed an air outlet 9 which is arranged to release the air which otherwise would be forced through the mill 3. The air outlet 9 may suitably be designed as an air filter which prevents the passage of finely divided plastic particles and, at the same time, dissipates the air flow, thereby damping any noise which is produced. The air outlet 9 also damps noise pollution in another manner, namely by leading off the air which would otherwise be forced through the small gaps between the fixed and rotary blades in the mill and would thereby be caused to oscillate powerfully with noise-generation as a result.

Although the receiving portion is shown on the FIGURE as having side walls which make substantially a right angle with the bottom 6, it is, naturally, also possible to incline the side walls of the receiving portion such that the receiving portion has the appearance of a funnel. In this alternative, the transitional region between the funnel-like design and the rectangular design of the supply portion may also suitably accommodate the pivotal flap 8. Such a design of the receiving portion may also be advantageous in that the flow velocity, on reduction of the cross-sectional area in the transitional region between the receiving portion and the supply portion will increase, whereby great material transfer distances may be attained without the need to increase the supply of compressed air any appreciable degree.

According to the invention, the nozzle means 7 is connected to a regulator device 7a which permits the pulsating discharge of compressed air from the nozzle means, it being possible for the length of the discharge interval to vary from half a second to several seconds, whereas the periods of rest may amount to considerably longer intervals. The regulator device for compressed air supply is designed, according to the invention, in such a manner that both the length of the air discharge intervals and the space between these intervals may be adjusted, in which event the periods of rest are adapted with respect to the working rate of the injection molding machine which the supply apparatus is to serve. The length of the operational periods of the nozzle means 7 may suitably be adapted first with respect to the amount of grinding material collected in the receptacle portion 1; secondly with respect to the shape and size of the particles constituting the grinding material; and thirdly to the supply distance which the grinding material is to travel. Naturally, it is also possible according to the invention to connect the regulator device for the compressed air supply directly to the time regulating equipment which controls the working cycle of the injection molding machine.

The invention may be modified within the spirit and scope of the appended claims. Thus, according to the invention, it is possible to regulate the compressed air supply manually instead of utilizing an automatic regulating device for the supply of compressed air to the nozzle means. Contrary to that shown on the drawing, it is also possible to design both the receiving portion 1 and the supply portion 2 with a different cross-section, in which instance, for example, the supply portion 2 may be of circular cross-section. Naturally, the length of the supply portion 2 may also be varied within broad limits, completely in dependence upon the needs of the occasion. Thus, the supply portion 2 may also be of telescopic design, whereby the subject matter of the present invention displays a very high level of operational flexibility.

What I claim and desire to secure by Letters Patent is:

1. A method of supplying a granulator mill with pieces of material such as scraps of plastic and the like which is discharged from another machine comprising the steps of feeding said material into a duct having a lower substantially imperforate wall, directing a driving gas current parallel and in proximity to the lower wall of said duct and at a point in advance of the entrance of said material to propel said material along the lower wall of said duct, blocking discharge of material from said duct in a direction opposite to the flow of said gas, restricting recirculation of gas in a direction opposite to said gas current during transport of said material, discharging at least a portion of said gas from said duct in one direction following said restriction and discharging said material from said duct in another direction.

2. The method according to claim 1 including the step of supplying said driving gas when a predetermined amount of material has been collected, discontinuing said driving gas after said material has reached said granulator mill and until a new predetermined amount of material is collected.

3. The method according to claim 2 including the step of regulating the driving gas supply in dependence upon the rate at which material is discharged from the material discharging machine.

4. Apparatus for supplying a granulator mill with pieces of material such as scraps of plastic and the like intermittently discharged from another machine comprising an elongated duct having a bottom wall, nozzle means at one end of said duct for directing a stream of gas parallel and in close proximity to said bottom wall, feeding means in said duct disposed forwardly of said nozzle means for feeding said material to said duct, a plate carried by said duct rearwardly of said feeding means for blocking discharge of said material from said one end of said duct, a flap within said duct and disposed forwardly of said feeding means for normally closing said duct and openable in response to said gas stream to permit the transport of material and prevent recirculation of gas, a gas outlet in said duct and disposed forwardly of said flap for discharging at least a portion of said gas and a material outlet disposed forwardly of said flap for discharging the transported material.

5. Apparatus according to claim 4 wherein said duct is rectangular in cross section having top, side and bottom walls, and said flap is rectangular and includes means on one edge thereof pivoting said flap in adjoining relationship to said top wall with the opposing edge contacting the bottom wall when in the closed position, said flap pivoting in a direction away from said nozzle means in response to said gas stream.

6. Apparatus according to claim 5 wherein said plate is in the form of a baffle extending from the top wall of said duct downwardly and forwardly to a line forwardly and slightly above said nozzle means.

7. Apparatus according to claim 4 including gas regulating means coupled with said nozzle means for controlling the flow of gas to said nozzle means.

* * * * *